United States Patent Office 2,792,664
Patented May 21, 1957

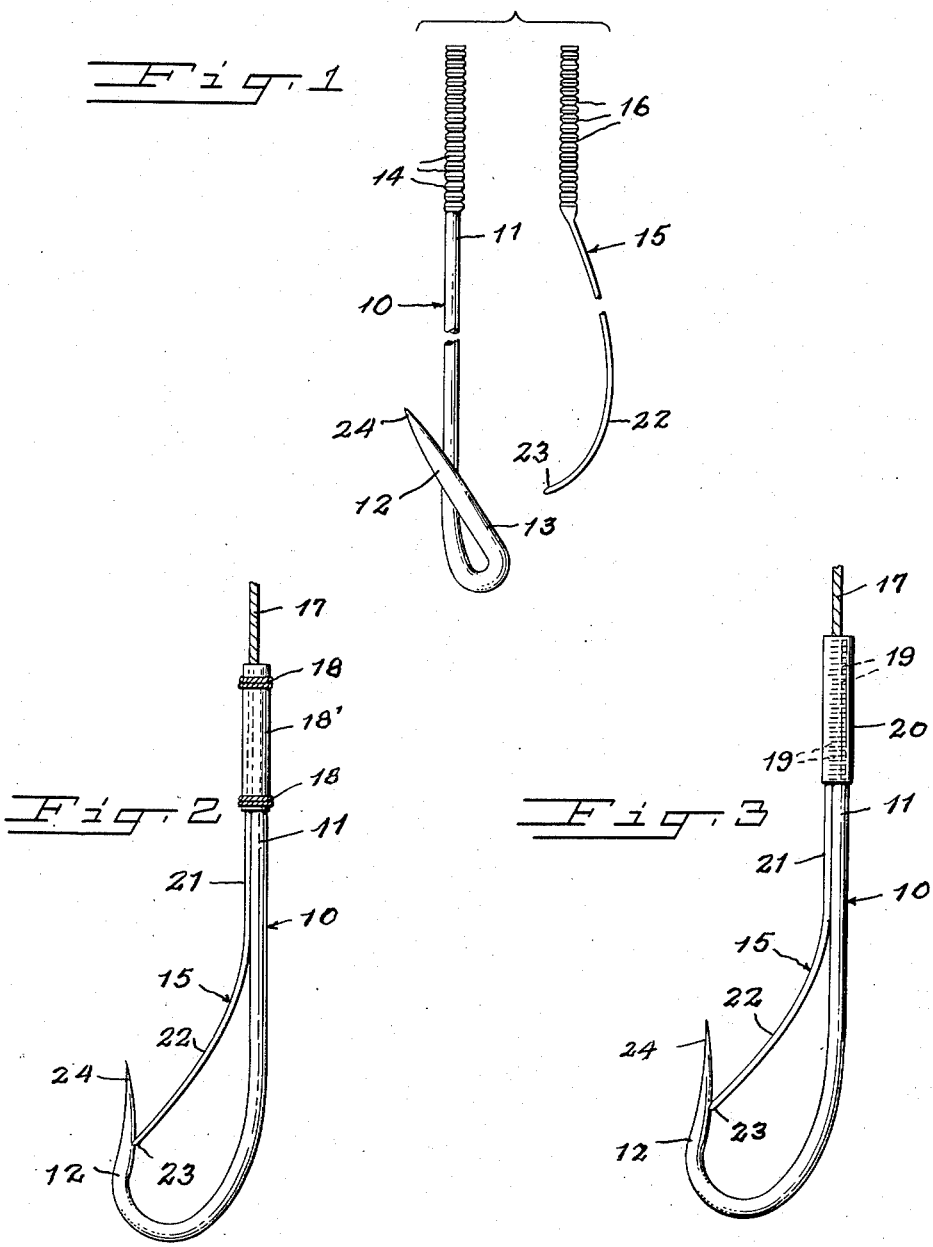

2,792,664
BARBLESS FISHHOOK

Fred Schwarzer, Pottstown, Pa.

Application June 4, 1954, Serial No. 434,423

1 Claim. (Cl. 43—43.16)

This invention relates to fish hooks and more particularly to a hook wherein the customary barb is eliminated, and it consists in the constructions, arrangements and combinations herein described and claimed.

In the use of present day barbed fish hooks quite often fish will swallow a hook so deeply that it is next to impossible to dislodge the hook except by holding the fish in one hand and endeavoring to manipulate the hook with the other hand in a manner so as to disengage the barb, resulting in the death of the fish due to excessive mutilation. Also, these hooks are dangerous to the fishermen themselves, since there is always the possibility that the hooks will engage a portion of the anatomy especially when casting.

It is therefore the cardinal object of the invention to provide a barbless fish hook wherein a flexible guard is employed for maintaining a fish on the hook, yet permitting the ready removal of the fish from the hook without coming into actual contact with the fish; the guard being so arranged with respect to the hook and shank thereof that a mere turning of the hook per se, will allow the weight of the fish to flex the guard away from the hook and is thus released therefrom.

It is also an object of the invenion to provide a barbless fish hook which may be readily manufactured, there being few parts and requiring but few assembly operations and which may be sold at a low cost, by virtue of its sturdy construction will be effective for use over a long period of time.

Additional objects, advantages and features of invention will be apparent from the following description considered in conjunction with the accompanying drawing, wherein Figure 1 is a disassembled view of the hook illustrating the first step in the formation of the hook.

Figure 2 is a side elevation of the hook in partly assembled relation, and

Figure 3 is a similar view of the finished hook.

In Figure 1 of the drawing, a hook 10 is shown in disassembled relation with respect to the guard, the hook having a shank 11, one end being formed into a hook member 12, the point of which is offset as at 13, with respect to the longitudinal axis of the shank. At a suitable point below the upper end of the shank 11, the shank is formed with a flattened face provided with a plurality of transverse ridges 14, forming a seat for a leader and a resilient guard 15 as will now be described.

The guard 15 is formed from a suitable length of light weight steel wire, the upper end of which is flattened and formed with a plurality of transverse ridges 16 which are complemental to the ridges 14 of the shank 11 of the hook.

In assembling the hook, a nylon leader 17 is interposed between the ridges 14 of the shank and the ridges 16 of the guard and secured by suitable threads 18, the parts being additionally secured by a suitable cement 18'. A final winding of thread 19 upon the cemented surface is applied and then covered with a water resistant shellac or cement 20, as shown in Figure 3.

It will be understood that the threads are drawn tightly upon the shank and guard so that the ridges of these members will bite into the leader and thereby secure the leader to the hook.

In the assembled hook, as shown in Figure 3, it will be seen that the guard 15 is formed with a straight portion 21 which lies substantially in a parallel line with the shank 11 for approximately one-half the length thereof and from such point, the strand forming the guard is given a curvature as at 22 in the direction of the offset portion 13 of the hook. The end 23 of the guard is sharpened and contacts the hook member 12 inwardly of the sharpened point 24. It will be noted that with the sharpened end of the guard against the hook there is but slight frictional engagement between the two members, the guard being readily flexed and movable away from the hook when a fish bites.

It will be seen that except for the slight injury effected by penetration of the point 24 in the bony structure of the mouth of the fish no other damage will have occurred and those fish which are not "keepers" may be returned to the water.

I claim:

A barbless fish hook comprising a shank having a flat face at its upper end, said shank face having a plurality of transverse ridges, a guard having a flat face at its upper end, said guard face having a plurality of transverse ridges complemental to the ridges of said shank, a leader interposed between the flat faces of said shank and guard, thread members wound around the upper ends of said shank and guard to draw the ridges of said faces into gripping engagement upon said leader and said thread member being provided with a waterproof cement.

References Cited in the file of this patent
UNITED STATES PATENTS

| | | |
|---|---|---|
| 1,093,000 | Kinsey | Apr. 14, 1914 |
| 1,403,602 | Horn | Jan. 17, 1922 |
| 1,457,373 | Kessel | June 5, 1923 |
| 1,717,190 | Coleman | June 11, 1929 |
| 2,094,267 | Faria | Sept. 28, 1937 |
| 2,124,263 | Schott | July 19, 1938 |
| 2,473,564 | Bergren | June 21, 1949 |
| 2,538,052 | Schwarzer | Jan. 16, 1951 |